(12) United States Patent
Mudd et al.

(10) Patent No.: US 9,663,686 B2
(45) Date of Patent: May 30, 2017

(54) SHEAR STRESS-RESISTANT SYSTEMS AND USES THEREOF

(71) Applicant: NuLabel Technologies, Inc., East Providence, RI (US)

(72) Inventors: Ashley M. Mudd, Providence, RI (US); Heidi M. Munnelly, Cumberland, RI (US); Benjamin D. Lux, Providence, RI (US)

(73) Assignee: NuLabel Technologies, Inc., East Providence, RI (US)

(*) Notice: Subject to any disclaimer, the term of this patent is extended or adjusted under 35 U.S.C. 154(b) by 0 days.

(21) Appl. No.: 14/709,117

(22) Filed: May 11, 2015

(65) Prior Publication Data

US 2016/0331087 A1 Nov. 17, 2016

(51) Int. Cl.
| | |
|---|---|
| *C09D 133/08* | (2006.01) |
| *C09J 127/06* | (2006.01) |
| *C09J 129/04* | (2006.01) |
| *C09J 131/04* | (2006.01) |

(52) U.S. Cl.
CPC .......... *C09J 127/06* (2013.01); *C09D 133/08* (2013.01); *C09J 129/04* (2013.01); *C09J 131/04* (2013.01)

(58) Field of Classification Search
CPC ..... B65C 1/00; B65C 2009/0059; B65C 9/00; C09J 2203/334; C09J 7/0296; C09J 127/06; C09J 129/04; C09J 131/04; G09F 3/04; G09F 3/10; Y10T 156/10; A44B 18/0073; A44B 18/0007; C09D 133/08; C08K 5/0016
See application file for complete search history.

(56) References Cited

U.S. PATENT DOCUMENTS

| | | | |
|---|---|---|---|
| 3,165,490 | A | 1/1965 | Uno |
| 3,289,386 | A | 12/1966 | Farmer |

(Continued)

FOREIGN PATENT DOCUMENTS

| | | |
|---|---|---|
| EP | 1783059 | 5/2007 |
| EP | 2361760 | 8/2011 |

(Continued)

OTHER PUBLICATIONS

Balzer, et al., "Cohesion mechanisms of polystyrene-based thin polymer films" Macromolecules, 46:7406-14 (2013).

(Continued)

*Primary Examiner* — David Upchurch
(74) *Attorney, Agent, or Firm* — Pabst Patent Group LLP

(57) ABSTRACT

A reusable, liner-free attachment system is described herein. The attachment system is compatible with the surfaces of a variety of materials, regardless of composition or physical characteristics. The system contains an anchoring site and a detachable article that binds specifically to the anchoring site. When bound together, the system provides anisotropic resistance to applied forces. The system is highly resistant to shear stress, but is easily detached by applying a pull-off force. The article typically contains a part A coating on the side or portion of the article that attaches to the anchoring site. The system can be used with a variety of articles, such as hooks, carpet tiles, medical devices, such as blood pressure cuff; climbing equipment, such as gloves, shoes or handles.

14 Claims, 6 Drawing Sheets

(56) References Cited

U.S. PATENT DOCUMENTS

| | | | |
|---|---|---|---|
| 3,410,772 A * | 11/1968 | Geld | E02B 17/0026 |
| | | | 156/60 |
| 3,531,316 A | 9/1970 | Sternasty | |
| 3,559,273 A * | 2/1971 | Porzio | A47G 27/0462 |
| | | | 16/16 |
| 4,334,431 A | 6/1982 | Kohno | |
| 4,519,095 A | 5/1985 | Clayton | |
| 5,089,320 A | 2/1992 | Straus | |
| 5,162,138 A | 11/1992 | Caflisch | |
| 5,233,380 A * | 8/1993 | Marvy | G03B 17/32 |
| | | | 294/150 |
| 5,334,431 A | 8/1994 | Longtin | |
| 5,403,025 A | 4/1995 | Shanley | |
| 5,417,790 A | 5/1995 | Petrou | |
| 5,538,289 A * | 7/1996 | Cassis, III | G09F 3/04 |
| | | | 283/55 |
| 5,628,858 A | 5/1997 | Petrou | |
| 5,656,369 A | 8/1997 | Chess | |
| 6,020,062 A | 2/2000 | Questel | |
| 6,054,006 A | 4/2000 | Pilon | |
| 6,210,795 B1 | 4/2001 | Nelson | |
| 6,298,894 B1 | 10/2001 | Nagamoto | |
| 6,306,242 B1 | 10/2001 | Dronzek | |
| 6,502,986 B1 | 1/2003 | Bensur | |
| 6,517,664 B1 | 2/2003 | Dronzek, Jr. | |
| 6,519,885 B2 | 2/2003 | Valiulis | |
| 6,656,319 B1 | 12/2003 | Boyd | |
| 6,663,746 B2 | 12/2003 | Dronzek | |
| 6,667,086 B2 | 12/2003 | Dronzek, Jr. | |
| 6,749,710 B2 | 6/2004 | Preston | |
| 6,854,189 B2 | 2/2005 | Schafer | |
| 7,039,958 B2 * | 5/2006 | Henricksen | A41F 19/005 |
| | | | 2/126 |
| 7,892,598 B1 | 2/2011 | Dronzek | |
| 7,943,714 B2 | 5/2011 | Schnieders | |
| 7,963,413 B2 | 6/2011 | Sierra-Gomez | |
| 8,091,323 B2 | 1/2012 | Paterson | |
| 8,334,335 B2 | 12/2012 | Lux | |
| 8,334,336 B2 | 12/2012 | Lux | |
| 2001/0037594 A1 | 11/2001 | Bohen | |
| 2001/0047161 A1 | 11/2001 | Wong | |
| 2003/0039412 A1 | 2/2003 | Rodick | |
| 2004/0221944 A1 | 11/2004 | Havard | |
| 2005/0031233 A1 | 2/2005 | Varanese | |
| 2005/0277358 A1 | 12/2005 | Isenberg | |
| 2007/0068896 A1 * | 3/2007 | Montgomery | A61J 9/00 |
| | | | 215/397 |
| 2007/0232497 A1 | 10/2007 | Chew | |
| 2008/0125295 A1 * | 5/2008 | Ingram | A63B 21/1442 |
| | | | 482/139 |
| 2008/0213529 A1 * | 9/2008 | Gray | A47G 27/0475 |
| | | | 428/44 |
| 2009/0277061 A1 * | 11/2009 | Jain | G06Q 99/00 |
| | | | 40/633 |
| 2011/0033698 A1 | 2/2011 | Woods | |
| 2011/0097023 A1 | 4/2011 | Moehlenbrock | |
| 2014/0072748 A1 * | 3/2014 | Cho | B65C 9/00 |
| | | | 428/40.1 |
| 2015/0131926 A1 | 5/2015 | Lux | |

FOREIGN PATENT DOCUMENTS

| | | |
|---|---|---|
| EP | 2551211 | 1/2013 |
| GB | 1333710 | 10/1973 |
| WO | 9734810 | 9/1987 |
| WO | 9919412 | 4/1999 |
| WO | 0214448 | 2/2002 |
| WO | 2014043342 | 3/2014 |
| WO | 2015073566 | 5/2015 |

OTHER PUBLICATIONS

Breard, "Hanging on through thick and thin: A look at static-cling vinyls", Screenprinting Magazine, pp. 1-9, Mar. 2005.

Ge, et al., "Carbon nanotube-based synthetic gecko tapes," PNAS, 104(26): 10792-5 (2007).

Jin, et al., "Challenges and solutions for joining polymer materials," Macromol. Rapid Commun., 35:1551-1570 (2014).

Randow, et al., "An investigation of the cling of thin polymeric films," J. Adhesion, 63: 285-307 (1997).

Yao, et al., "Adhesion and sliding response of a biologically inspired fibrillar surface: experimental observations," J. R. Soc. Interface, 5:723-33 (2008).

* cited by examiner

SHEAR STRESS-RESISTANT SYSTEMS AND USES THEREOF

FIELD OF THE INVENTION

This invention is generally in the field of removable materials and systems that provide anisotropic resistance to applied forces.

BACKGROUND OF THE INVENTION

Shear stress-resistant systems, such as those that display anisotropic resistance to applied forces are particularly useful in applications that require freedom of movement in a desired direction, but not in other directions. These systems allow for repeated strong attachment and facile detachment of objects depending on the direction of the applied force. An example of such a system is found in nature in the foot pads of insects and the wall-climbing gecko. See, e.g., Yao, et al., "Adhesion and sliding response of a biologically inspired fibrillar surface: experimental observations," *J. R. Soc. Interface*, 5:723-733 (2008); Ge, et al., "Carbon nanotube-based synthetic gecko tapes," *Proc. Nat. Acad. Sci.*, 104(26): 10792-10795 (2007); Jin, et al., "Challenges and solutions for joining polymer materials," *Macromol. Rapid Commun.*, 35:1551-1570 (2014).

Ge et al., describe carbon nanotube-based synthetic tapes that display anisotropic properties that are similar to those displayed on the foot pads of a gecko, but show shearing resistance four times higher than the gecko's foot pads. However, these synthetic tapes are non-specific and bind to almost any surface. See Jin, et al. Systems and materials that exhibit such non-specific binding can require protective release liners during shipment, to prevent the materials (e.g., synthetic tapes) from attaching to unintended surfaces or from picking up impurities.

Also, the use of a release liner increases the expense and negative environmental impact with respect to production and elimination of waste.

Accordingly, there remains a need for improved removable, and optionally re-attachable systems and materials.

Therefore, it is an object of the invention to provide improved attachment systems and materials.

It is also an object of the invention to provide methods of making and using such systems and materials.

SUMMARY OF THE INVENTION

A removable and optionally re-attachable, liner-free attachment system is described herein. The system contains an anchoring site and a detachable article that binds specifically to the anchoring site. When bound together, the system provides anisotropic resistance to applied forces. The system is highly resistant to shear stress, but is easily detached by applying a pull-off force. The detachable article typically contains a coating, referred to herein as the "part A coating", on the side or portion of the article that attaches to the anchoring site.

The anchoring site can be a film of a polymeric or non-polymeric material, such as poly vinyl chloride, polyurethanes, neoprene, silicones, rubbers, polyethylene terephthalate, high and low density polyethylene, polyamide, polypropylene, polycarbonate, polyolefins, ethylene vinyl acetate, polystyrene, polyvinyl acetate, nitrile, and combinations thereof or a paper or coated with a second coating or a coating strip, such as poly vinyl chloride (PVC). The film that forms the anchoring site or the coating on the anchoring site is typically a different material from the part A coating on the article. For instance, the anchor can contain a plasticizer to impart flexibility, while the part A coating does not include a plasticizer. Further, the anchoring site or coating thereon is an extruded or cast polymer, while the part A coating is formed from a water-based emulsion polymer. However, the polymers used to make the coating and/or materials of part A and can be the same as or similar to the polymers that make up the anchoring site materials.

The anchoring site can be affixed to a substrate to which the article is to be attached after manufacture or can be incorporated into the substrate during manufacture. The anchoring site can cover the entire surface of the substrate or only a portion thereof.

The article can be formed from a variety of materials, including, but not limited to, wood, plastic, metal, glass, textile, fabric, ceramics, composites, paper or polymeric materials. The article is coated with a material or materials that allow it to specifically attach to the anchoring site. Suitable materials for forming the coating include, but are not limited to, polyvinyl alcohols, polyvinyl acetates, polyvinylpyrrolidones, polyvinylpyrrolidone-vinyl acetate copolymers, polyacrylic acids, polyethylene glycols, poly(2-ethyl-2-oxazoline), polyacrylamide copolymers, ethylene vinyl acetates, natural and reclaimed rubbers, polyurethanes, non-carboxylated and carboxylated styrene-butadiene rubbers, polyacrylates based on the polymerization of monomers of methacrylates, methyl acrylate, ethyl acrylate, 2-chloroethyl vinyl ether, 2-ethylhexyl acrylate, hydroxyethyl methacrylate, butyl acrylate, butyl methacrylate or combinations of the previous, polyamides, polyesters, polyolefins, chlorinated-polyolefins, polyolefins containing maleic anhydride, polystyrenes, polyvinyl esters, polyvinyl ketones, polydiene elastomers, polyiso butylenes, poly butadienes, polychloroprenes, poly styrene acrylics, carboxylated acrylic, styrene and/or butadiene polymers, cellulose derivatives, particularly alkyl cellulose derivatives (cellulose acetate, methyl cellulose, ethyl/hydroxyethyl, hydroxymethylpropyl cellulose, etc.), ureas, gelatins, alginates, agars, gum arabics, as well as combinations of the above materials. In some embodiments, the coating contains styrene acrylic polymers, ethylene acrylic polymers, neoprene, and combinations thereof.

In some embodiments, the article temporarily attaches to the anchoring site through electrically neutral attachment forces between smooth surfaces. "Temporarily attaches" as used herein generally means that the detachable article can be affixed for any period of time, e.g., less than one minute to greater than one year, removed undamaged, and placed in a new location (with another anchoring site) or a new detachable article may be attached to the same location on the same anchoring site at any time point. The detachable articles exhibit good peel strength, little or no transfer of the coating to the anchoring site, and good blocking resistance properties.

The absence of a liner also reduces cost, as there is no longer a silicone-coated release liner, which is costly to produce and waste since the absence of the liner eliminates the need to discard used liners and reduces the negative environmental impacts of producing, shipping and eliminating liners in the labeling process. Additionally, the attachment system described herein allows the articles to be removed from the anchoring site cleanly, which reduces the time required to remove the article and eliminates the necessity of cleaning the substrate after removal to further reduce the time and cost associated with attaching articles to substrates. "Remove cleanly", as used herein, generally means that the anchoring site is free of debris and buildup and the coatings on both the article and the anchoring site are smooth and undisturbed as evaluated by visual inspection.

The attachment system provides articles that can be easily attached, removed, and re-attached, which can reduce time and costs associated with user assembly errors.

The adhesive on the back side of the anchoring site of the attachment system is compatible with articles formed from a variety of materials, regardless of composition or physical characteristics, and allows for large quantity batch production without the need to formulate adhesives for the surfaces of specific materials. The part A coated detachable articles and anchoring sites are produced on a large scale, stored, and later applied since the part A coating and anchoring site coating are formulated to interact specifically or selectively with each other via electrically neutral attachment forces and have an unlimited open time.

DETAILED DESCRIPTION OF THE INVENTION

I. Definitions

Figure 1A:
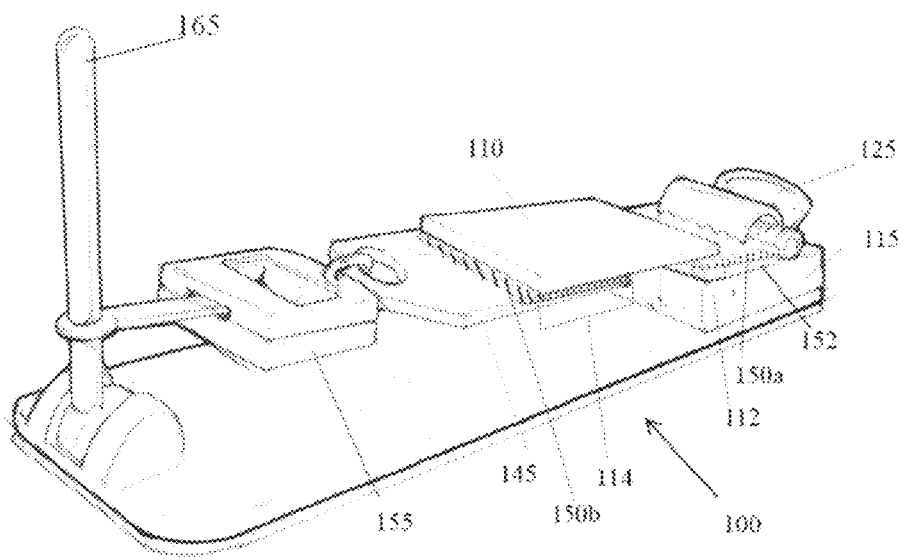
FIG. 1A is a schematic of a device 100 that was used to perform the extreme 0° peel testing.

"Adhesive", as used herein, refers to a compound or compounds that adhere or bond two items together.

The terms "anisotropic" and "anisotropy" as used herein, refer to the phenomenon of a substance showing different properties based on the direction of applied force(s).

"Peel strength" refers to a quantitative measure of a substance's ability to resist movement over, apart or away from another substance without breaking the bonds between the substances.

"Low peel strength" refers to a peel strength value that is less than 100 g/in, as measured using a modified ASTM D3330 described in the Examples.

"High peel strength" refers to a peel strength value that is greater than 200 g/in, as measured using a modified ASTM D3330 described in the Examples.

"High," as relates to forces, refers to an applied force of at least 25 N.

"Low," as relates to forces, refers to an applied force that is less than 1 N.

"Pull-off force" refers to a force that pulls one material away from another material, i.e., when the first material is initially parallel to the second material, and lays on top of the second material, then a pull-off force peels the first material upward, moving from a parallel position towards a perpendicular position relative to the second material. A pull-off force moves the first material in a non-lateral direction relative to the second material.

"Removable and detachable" are used interchangeably herein to describe an article that can be readily separated from its current position. Readily separated refers to applying a low pull-off force to remove the article from an anchoring site.

"Shear" refers to deforming a system by applying a force that causes one or more layers of the system to glide, slide, shift, or move laterally with respect to one or more layers in the system.

"Temporary attachment agent", as used herein, refers to an attachment agent designed to repeatedly or easily stick and unstick. In some embodiments, the temporary attachment agent may be a part A coating or part A coating strip. In some embodiments, the detachable attachment articles are designed to be reapplied from 1 to 50 times or more while the anchoring site is designed to be reusable from 1 to 500 times or for up to one year to 5 years of continuous use.

"Easily" as used herein generally means that that the detachable attachment article attaches without additional pressure beyond hand application (i.e. no weighted rollers or mechanical devices needed) for attaching the article to the anchoring site. Detachable attachment articles that easily unstick only require hand forces to remove, i.e. no scraping tools or other devices or chemicals needed to remove labels. The detachable attachment article remains intact and undamaged after removal.

"Pressure sensitive adhesive" (PSA) is a term known in the art used to designate a distinct category of permanent or temporary adhesives which in dry form (solvent/water free) are aggressively and permanently tacky at room temperature and that firmly adhere to a variety of dissimilar surfaces upon mere contact without the need of more than finger or hand pressure. These products require no activation by water, solvent, or heat in order to exert a strong adhesive holding force toward such materials as paper, plastic, glass, wood, cement, and metal.

"Attachment force" refers to intermolecular forces with which the part A coating on the detachable article and the anchoring site coating on the anchoring site interact with each other. The attachment force is derived from electrically neutral species. It includes intermolecular hydrogen bonds, and van der Waals forces, such as dipole-dipole interactions, dipole-induce dipole and induced dipole-induce dipole interactions. In the case of hydrogen bonds, it is to be understood that both interacting species are each electrically neutral. The detachable article and the anchoring site attach to each other without additional pressure beyond hand application (i.e. no weighted rollers or mechanical devices are needed). The part A coating is selective to the anchoring site coating.

"Blocking" refers to the formation of a strong physical interaction between the coating of the label and the top of the label when the label is in roll or stacked form.

"Open time" as used herein, refers to the amount of time between the activation of the adhesive and the application of the label to a substrate.

II. Attachment System

A liner-free attachment system, which allows detachable articles to be stacked and/or wound, where applicable, without the use of a release liner, and to be used repeatedly, is described herein. The system described herein provides part A coated detachable articles that remove cleanly, which reduces the time required to remove the part A coated detachable article and eliminates the necessity of cleaning the substrate after removal of the article to remove residual adhesive. This further reduces the time and cost associated with applying articles on substrates. The system can be easily reused and reapplied, which can reduce time and costs associated with user assembly errors. The attachment system is compatible with detachable articles made from a variety of materials, regardless of composition or physical characteristics.

The attachment system is generally stable to changing environmental conditions, such as temperature, humidity, etc. "Stable", as used herein, generally means the article remains adhered and in place under various environmental conditions. The attachment system can be used to provide a durable permanent or detachable article that attaches to difficult to adhere to substrates and/or substrates that are typically exposed to harsh conditions. In this instance, difficult to adhere to substrates may include low surface energy plastics or dirty or dusty substrates. These substrates present challenges when using traditional pressure sensitive adhesive systems, mainly low adhesive peel strengths, which are overcome with the attachment system described herein. Harsh conditions include, but are not limited to, low temperature, high temperature, high humidity, and low or high pH. The extreme temperature range is from −20° C. to 60° C. High humidity conditions are also a consideration. Similar to PSA's, the detachable article with a part A coating, does not strongly interact with the coating on the anchoring site if moisture is present between the two materials. High and low pH treatments such as wiping or soaking the anchoring site with a cleaning product (Simple Green, Windex, DI water, vinegar, etc.) does not impact strength of the interaction of Part A to the anchoring site as long as the surface is dried (e.g. by wiping or air dried).

A. Anchoring Site

The anchoring site is permanently affixed to, or configured to be permanently incorporated into, a substrate to which the article is to be attached. In some embodiments, the anchoring site is affixed to the substrate after the substrate is manufactured but before the articles are applied.

The anchoring site film thickness range is typically 0.001" to 0.200", preferred range is 0.015" to 0.100" and most preferred range is 0.020" to 0.050".

While the anchoring site is not necessarily selective in adhesion, the non-tacky, part A coating is specific or selective to the anchoring site.

a. Anchoring Site Coating or Anchoring Site Coating Strip

The anchoring site typically includes an appropriate material to which the reusable, liner-less part A coated detachable article is applied. No additional coatings are necessary. The anchoring site is typically extruded as a mixture of a polymer with a plasticizer of the polymer. In some embodiments, the anchoring site can also be spray applied, machine coated, or applied at a surface with a brush. The anchoring site can be manufactured from the solid polymers/plasticizers, from aqueous-based emulsions that include plasticizers or from solvent-based polymer and plasticizer solutions, pastes, or liquids. The part A coated article generally attaches to the anchoring site not through the formation of a charge but rather through electrically neutral attachment forces between two smooth surfaces. Suitable films or coatings for the anchoring site include, but are not limited to, poly vinyl chloride (PVC), nylon, silicone, butyl rubber, ethylene propylene diene monomer rubber, viton rubber, neoprene rubber, polyurethane, and combinations thereof.

Generally, the pliability of the anchoring site films is derived from the impregnation of plasticizers into the films. Suitable plasticizers include, but are not limited to, phthalate plasticizers, such as DOP/DEHP (dioctyl phthalate and di-2-ethyl hexyl phthalate) and DBP (dibutyl phthalate) but these have been replaced by BBP (butyl benzyl phthalate) and DINP (diisononyl phthalate) because they are less volatile and migratory so less hazardous. Other plasticizers can also be used. Controlling migration of the plasticizer can vary the peel strength of the label affixed to the anchoring site. For example, altering the molecular weight and/or modifying the steric bulk of functional groups on the plasticizer molecules can control the migration of the plasticizer. A higher molecular weight and/or the presence of bulky functional groups results in slow/less migration while a lower molecular weight and/or less bulky (or linear) groups result in a faster/higher degree of migration. Slow/less migration of plasticizer provides for more temporary label adhesion to the anchoring site. Fast/high migration of plasticizer provides for more permanent label adhesion to the anchoring site. Internal plasticizer refers to plasticizers covalently bonded to the polymer while external are added to the polymeric mixture but are not physically bonded to the polymer. Internal plasticizers have lower degree of migration than external plasticizers.

b. Linered Anchoring Site

The anchoring site can be provided as a linered element with an adhesive coated on it with a liner. The linered anchoring sites provide end users the ability to permanently affix the anchoring site to a substrate. The adhesive is applied to the back side of the anchoring site. With the anchoring site permanently affixed, part A coated detachable articles can be applied, removed, and reapplied over and over. Thus, the initial step in the use of this system is the removal of the liner from the anchoring site followed by the application of the anchoring site coating to the substrate. Instead of using thousands of linered, part A coated detachable articles, the system described herein allows for the use of one linered anchoring site coating strip anchoring site with a multitude, such as hundreds or thousands, of liner-free part A coated detachable articles.

c. Anchoring Site Permanently Affixed to Substrate

The anchoring site can be permanently affixed to the substrate using a variety of techniques in the art. In some embodiments, the anchoring site is permanently affixed to the substrate using an adhesive, such as a pressure sensitive adhesive (PSA), as shown in FIG. 1.

i. PSA

In some embodiments, the PSA has sufficient adhesive holding power and elastic nature so that it essentially permanently affixes the anchoring site to the substrate in a variety of environmental conditions, hot and cold temperatures, varying humidity levels, etc. This is particularly useful for substrates that are exposed to hard environments, such as walls and floors made of wood, concrete, brick, metals, ceramics. Suitable pressure sensitive adhesives include, but are not limited to, acrylics, styrene butadiene resin, rubbers, and silicones, optionally in combination with one or more additives, such as tackifying resins, plasticizers, oils, antioxidants, etc. and combinations thereof.

ii. Attachment of Anchorite Site to Substrate During Manufacture of the Substrate In another embodiment, the anchoring site is introduced into or onto the substrate during manufacture of the substrate, i.e., co-extrusion. The co-extrusion process results in the affixing of the anchoring site material to the substrate, preferably a more rigid polymeric material. This is the most common way to permanently join two polymeric materials together. In this embodiment, the PSA is laminated on the back side of the anchoring site material. The anchoring site may include, at the time of manufacture, a film or coating to which the part A coated detachable article will attach or such a material may be applied to the site after the substrate is manufactured. For instance, in the case of floors or walls, the film or coating to which the part A coated detachable article is able to attach, can be applied by spraying or brush-applied.

In a specific embodiment, the anchoring site is an aqueous or solvent based coating that is introduced to paneling, sheet rock, or a floor tile through a web coating technique, including, but not limited to gravure, reverse gravure, slot die, rod, knife-over-roll, flexographic, or offset coating. Part A coating is applied to a wall paper or carpet tile, while the anchoring site is sprayed or brushed onto the wall or floor material.

In another embodiment, the anchoring site is mechanically fixed or fastened to the substrate. In yet another embodiment, the entire substrate can act as an anchoring site. This is particularly relevant to certain plastic parts, including, but not limited to those made of plasticized PVC.

B. Substrates

The anchoring site can be permanently affixed to, or incorporated into or onto, a variety of substrates manufactured from a variety of materials. In some embodiments, the substrate is prepared from paper or coated paper, cardboard or coated cardboard, plastic, glass, sheet rock, wood, cement, metal, textile, fabric, ceramics, composites, or combinations thereof. In particular embodiments, the substrate, or the portion of the substrate, to which the anchoring site is affixed is plastic (e.g., PE, PET, etc.). In other embodiments, the substrate is formed from paper or cardboard or coated paper or cardboard. In yet another embodiment, the substrate is formed from Tyvek® or materials similar in construction to Tyvek®. In certain embodiments, the anchoring site can be manufactured into the desired substrate and be a permanent feature of said substrate. In other embodiments, the substrate can act as the anchoring site. This is particularly applicable to certain plasticized plastics, including, but not limited to, PVC.

In other embodiments, the anchoring site itself can be removable. This is particularly relevant in the manufacture of parts and assemblies that require multiple manufacturing steps and processes. In these systems, different articles may be applied to and removed from said assembly during multiple manufacturing steps. Once the assembly is complete, the final article and anchoring site can be readily removed.

C. Coated Detachable Articles

The system also includes one or more reusable, liner-less part A coated detachable articles. The detachable articles can be made from a variety of substances, such as wood, plastic, metal, glass, textile, fabric, ceramics, composites, paper or polymeric films. Suitable articles include, but are not limited to, paper, top-coated and non-top-coated grades of direct thermal paper, polymer films, woven and non-woven synthetic materials, wood, metal films, composites, and combinations thereof. The detachable articles include, but are not limited to, replacement hooks, wall paper, paintings, carpet tiles, signs, blood pressure cuffs, climbing handle, removable climbing holds, and gloves.

The detachable article is coated with one or more materials, which temporarily attach the detachable article to the anchoring site. In some embodiments, the detachable articles are coated with a part A coating strip or coating which temporarily attaches the detachable article to the anchoring site. The part A coated detachable article can attach to the anchoring site via electrically neutral attachment forces between the smooth anchoring site and the smooth detachable article.

a. Part A Coating or Part A coating Strip on the Article

The terms "Part A coating" and "Part A coating strip" are used interchangeably to refer to materials that are coated on to the surface of an article and attach to the surface of a corresponding anchoring site coating via an electrically neutral attachment force between the surfaces. The coatings are generally smooth surfaces. The part A coating or part A coating strip does not contain plasticizers, forms a smooth film when dry. The anchoring site coating can be impregnated with plasticizers to introduce the flexibility and pliability to the material required for its attachment behavior in this form. Thus, these coatings are capable of sticking to smooth surfaces in a wide range of environmental conditions, such as variable temperatures and humidity levels. Variability in temperature and humidity do not significantly affect the interactions between the smooth surfaces, although wet surfaces generally do not generate good interactions. The part A coating is selective, that is, it does not attach to itself or other materials, with the exception of the anchoring site. The part A coating and/or the material that is used to prepare the part A coating may contain one or more additives, such as stabilizers, surfactants, etc.

The part A coated film is typically non-tacky, which allows it to be wound onto its face side in roll or stacked in sheet form.

Suitable coatings materials include, but are not limited to, polyvinyl alcohols, polyvinyl acetates, polyvinylpyrrolidones, polyvinylpyrrolidone-vinyl acetate copolymers, polyacrylic acids, polyethylene glycols, poly(2-ethyl-2-oxazoline), polyacrylamide copolymers, ethylene vinyl acetates, natural and reclaimed rubbers, polyurethanes, non-carboxylated and carboxylated styrene-butadiene rubbers, polyacrylates based on the polymerization of monomers of methacrylates, methyl acrylate, ethyl acrylate, 2-chloroethyl vinyl ether, 2-ethylhexyl acrylate, hydroxyethyl methacrylate, butyl acrylate, butyl methacrylate or combinations of the previous, polyamides, polyesters, polyolefins, chlorinated-polyolefins, polyolefins containing maleic anhydride, polystyrene acrylates, polystyrenes, polyvinyl esters, polyvinyl ketones, polydiene elastomers, polyiso butylenes, poly butadienes, polychloroprenes, poly styrene acrylics, carboxylated acrylic, styrene and/or butadiene polymers, cellulose derivatives, particularly alkyl cellulose derivatives (cellulose acetate, methyl cellulose, ethyl/hydroxyethyl, hydroxymethylpropyl cellulose, etc.), ureas, gelatins, alginates, agars, gum arabics, as well as combinations of the above materials.

The coating weight can be varied depending on the material to be coated and the substrate. In some embodiments, the coat weight is from about 3-10 lbs/3000 sq. ft., such as about 7 lbs/3000 sq. ft. However, on polymeric films, such as polypropylene, poly ethylene terephthalate, polyester, and polystyrene, the coat weight can be significantly lower than 7 lbs/3000 sq. ft., or as low as 1 lb/3000 sq. ft. On paper or porous facesheets, a higher coat weight is needed to obtain a smooth film on the surface.

The part A coating is generally smooth and allows for electrically neutral interactions with the anchoring site. For the styrene acrylic type formulations, the coating material preferably forms a smooth, hard film that the PVC can interact with, allowing the detachable article to attach to the anchoring site. Thus, specific coating and anchoring site pairs can be developed for this system. In a non-limiting embodiment, the part A coating contains styrene acrylic polymer, while the anchoring site contains plasticized PVC. In another embodiment, the part A coating contains polyurethane polymers and demonstrates selectivity for plasticized PVC anchoring sites.

In some embodiments, the part A coating contains a styrene acrylic having a glass transition temperature from about −20° C. to about 80° C. and an acid number from about 50 mg KOH/g polymer to about 210 mg KOH/g polymer, preferably from about 50 mg KOH/g polymer to about 205 mg KOH/g polymer. The molecular weight of the polymer can vary but is typically greater than about 100,000 Daltons, 150,000 Daltons, 200,000 Daltons, 250,000 Daltons, or 300,000 Daltons.

In particular embodiments, the coating material contains a blend of a styrene acrylic with an ethylene acrylic acid. In other embodiments, the coating materials contain a blend of two or more styrene acrylics in combination with an ethylene acrylic acid polymer.

Exemplary materials that can be used to prepare to part A coatings are listed in Table 1. In particular embodiments, the coating material contains an ammonium salt of styrene acrylic emulsions or ammonium salt of modified acrylic copolymer emulsions, alone or in combination with a second modified salt of styrene acrylic emulsion, modified ethylene acrylic acid dispersion, or sodium salt of styrene maleic anhydride resin, and optionally in combination with a third component, such as neoprene. In some embodiments, the coating material contains a mixture of only styrene acrylics.

The amount of the various components in the part A coating can vary. However, in some embodiments, the amount of the styrene acrylic polymer(s) is at least about 40, 45, 50, 55, 60, 65, 70, 75, 80, 85, or 90% by weight of the composition. In those embodiments containing neoprene, neoprene is generally present in an amount less than about 40, 35, 30, 25, 20, 15, or 10% by weight of the composition. In other embodiments, the coating material contains about 100% of styrene acrylic(s).

In other embodiments, the attachment system contains a plasticized PVC film anchoring site with a part A coated detachable article, where the part A coating on the article consists of the same film (i.e. PVC on PVC), but not plasticized to the same extent, i.e., the part A coating is more rigid and non-tacky.

b. Additives in the Part A Coating

The part A coating can also contain one or more additives. Suitable additives include, but are not limited to, acids, bases, buffers, antimicrobial agents, stabilizers, emulsifiers, and/or defoaming agents, as needed for the particular application. Potential classes of additives include, but are not limited to, colorants, both dye and pigment based, salts, sugars, other carbohydrates, polyelectrolytes, proteins, dry and liquid surfactants, resins, wetting agents, additive that provide desired lay flat properties of the labels, such as humectants, polyethylene glycol, and/or salts, other similar materials as well as combinations thereof.

In some embodiments, the coating is impregnated with one or more plasticizers to impart flexibility and pliability to the coating. Suitable plasticizers include, but are not limited to, phthalates, benzoates, polyols, polyol polyethers, diols, citrates, phosphates, adipates, azellates, trimellitates, and combinations thereof.

D. Properties of the Attachment System

The attachment system described herein maintains its integrity in varying environmental conditions, such as hot and cold temperatures and different humidity levels.

The part A coated detachable article itself should have a peel strength sufficient to ensure that the part A coated detachable article does not readily fall off the anchoring site, but requires some strength to remove the part A coated detachable article from the anchoring site. In particular, the attachment system shows high resistance to shear stress. FIGS. 1A-1B and 2A-2B depict standard devices and set ups that can be used to measure the 0° peel strength and the 180° peel strength for an attachment system. In some embodiments, the peel strength in response to shear stress (i.e. the "0° peel strength") is preferably greater than 10,000 g/in, ore preferably more than 20,000 g/in, most preferably 40,000 g/in or greater, such as in the range from 40,000-100,000 g/in, and the corresponding peel strength in response to a pull-off force (i.e. the "180° peel strength") is in the range from 40-1040 g/in when ~5 lbs/3000 ft$^2$ is used. In some embodiments the peel strength in response to shear stress is even greater, such as in the range from 50,000-110,000 g/in and the corresponding peel strength in response to a pull-off force is in the range from 40-1170 g/inch when ~21 lbs/3000 ft$^2$ is used.

In one embodiment, the part A coated detachable article is reusable and therefore cannot transfer coating material from the detachable article to the anchoring site.

The part A coating on the detachable articles also exhibits excellent blocking resistant properties. Blocking is a measurement of bond formation between the coatings of the detachable article and the top of the detachable article when the detachable article is in rolled, where applicable, or stacked.

III. Methods of Making

The detachable articles can be coated with the part A coating or part A coating strip using techniques known in the art including, but not limited to spraying, roll coating, curtain coating, wiping, and painting. For example, part A coating formulations can be coated onto the articles using a Mayer rod bar coater with a target coat weight of 7 lb/3000 sq. ft. The coat weight can vary depending on the formulation and detachable article.

In some embodiments, the part A coating can be applied to the detachable articles utilizing typical web coating methods including, but not limited to, knife-over-roll, gravure, reverse-gravure, metering rod, slot die, and air knife coating methods.

The coat weight of the part A coating composition on the article is largely dependent upon morphology of the coating upon drying; a smooth surface must be presented to the anchoring site to maximize the surface area for attachment. To reduce cost, coat weights of 1.5 lb/3000 sq. ft. are typically used. However, coat weights up to 15 lb/3000 sq. ft. may also be used.

After the application of the part A composition to the detachable article, the remaining water and solvent are extracted from the part A composition. This may be accomplished using conventional methods including, but not limited to, air flotation oven, web over rollers oven, energy cure methods, and the like.

Optionally, it may be desirable to coat thermally activated paper and films. Care must be taken in part A coating composition selection to ensure that the components formulating the part A coating composition do not contain certain chemistries or solvents that negatively interact with the embedded thermal dye. In addition, during the drying (or solvent removal) process, the heat or energy from the process should not activate the thermal paper (a processes known as imaging).

Sometimes the coating of a web with a part A coating can induce a phenomenon known as a shape memory or curling. As it is often important for end applications that detachable articles, such as tiles and wall paper, have lay flat properties, a number of additives can be added to the part A coating formulation to prevent curl, as described earlier. In addition, mechanical methods can be employed to reduce curl. Also, the addition of vaporized water (or other liquid vapors) to the non-part A coated side of the tiles or wall paper can have dramatic effects in reducing curl.

Other suitable methods include the lamination of a part A coating strip onto a detachable article, as well as hot melt, solvent coating, etc.

In those embodiments where an anchoring site is provided with the detachable article, the anchoring site can be pre-treated with an adhesive, such as a pressure sensitive adhesive, to permanently affix the anchoring site to the substrate. The anchoring site can be coated using techniques known in the art. Once the anchoring site is affixed, it should semi-permanently adhere to the substrate and serve as an attachment surface for multiple detachable articles over an extended period of time. In some embodiments, articles are able to attach to the anchoring site for a period of time ranging from 1 day to 5 years, preferably from 6 months to 5 years, more preferably from 1 year to 5 years. In other embodiments, the time period during which the anchoring site is able to attach to articles is from 1 day to 12 months, and most preferable 1 week to 6 months.

IV. Applications

The attachment systems may be used to attach, remove (if needed), and reattach (if needed) a variety of articles to a substrate. In some embodiments, the systems are applied to a wall, door, or floor. The systems allow for repeated strong attachment and easy detachment of the article when a low pull-off force is applied in a particular direction, typically at an angle greater than 0°, preferably the force is applied at an angle greater than 0° and up to about 90°, relative to the substrate to which the article is attached.

The attachment system may be combined with an article to provide detachable articles that can be easily reused and reapplied. These systems can be used to reduce time and costs associated with user assembly error. The adhesive on the back side of the anchoring site of the attachment system is compatible with the surfaces of a variety of materials, regardless of composition or physical characteristics and allows for large quantity batch production without the need to formulate adhesives for the surfaces of specific materials. The part A coated detachable articles and anchoring sites can be produced on a large scale and stored, or produced on demand, and later applied since the part A coated detachable articles work via an electrically neutral attachment and have an unlimited open time.

The absence of a liner in the part A coating reduces inventory requirements and roll-changeover time. The absence of a liner also reduces cost, as there is no silicone-coated release liner, which is costly to produce and waste since the absence of the liner eliminates the need to discard used liners and reduces the negative environmental impacts of producing, shipping and eliminating liners in the process of applying the detachable article to the anchoring site. A liner is included only on the back side of the anchoring site, if the back side contains a PSA.

1. Hooks

Hooks for attaching items to walls or doors, or other vertical surface are typically affixed to the surface via glue or another adhesive, nails, screws or similar means. The system described herein, can be used to replace the current affixing means for hooks.

One or more anchoring sites may be affixed to a vertical surface, such as by placing the PSA, which is attached to the back side of the anchoring site, in contact with the wall or door to which it is to be affixed. When the anchoring site is attached to the vertical surface, the anchoring site coated surface is exposed and thus available for attachment to the article (e.g. the hook). Then one or more hooks are affixed to the anchoring site(s) via electrically neutral attachment forces. An item, containing one or more suitable structures that can be fitted to the one or more hooks can then be placed on the one or more hooks. The item can be removed and re-attached to the hook, or replaced with another item. In addition, the one or more hooks can be removed from the anchoring site(s) and re-attached or a different set of hooks or knobs can be attached to the same anchoring site(s) one or more times.

Any suitable item can be attached to the hook, such as pictures, paintings, clothes, curtain holders, television sets or other objects that are commonly affixed on or to a vertical surface.

Figures 3A, 3B:
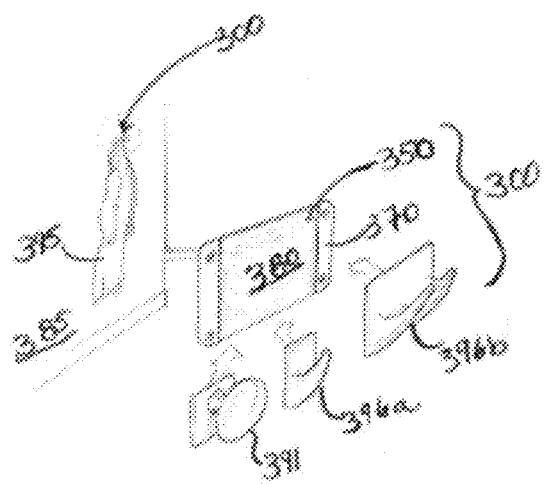
FIG. 3A shows an exemplary attachment system 300 on a vertical surface 385, with an item 395 hanging from a detachable hook.
FIG. 3B is an exploded view of the attachment system of FIG. 3A with exemplary interchangeable detachable knobs and hooks.

An exemplary system containing interchangeable hooks and knobs that are attachable to and removable from an anchoring site is depicted in FIGS. 3A and 3B. Components of the attachment system 300 depicted in FIGS. 3A and 3B include an anchoring site 350, and one or more hooks 396a, 396b or knobs 391 for affixing items 395 to walls 385 or doors, or any other vertically aligned surface. In these embodiments, the detachable article to be attached to the vertical surface is the hook 396 or knob. The one or more hooks or knobs may be provided separately or as part of an attachment system 300 for hanging or attaching a particular item to the substrate, such as pictures, paintings, clothes, curtain holders, television sets or other objects that are commonly affixed on or to a vertical surface.

The anchoring site 350 contains a front side 370, which is covered in part or completely with a coating 380, and a back side (not shown in figures), which is covered in whole or in part by an adhesive. The detachable hooks and knobs contain a back side (not shown in figures), which is covered in whole or in part by a part A coating. The hook or knob is attached to the anchoring site 350 by contacting the back side of the respective hook or knob with the front side 370 of the anchoring site 350.

One or more anchoring sites 350 may be affixed to a vertical surface 385, such as by placing the adhesive, such as a PSA, in contact with the wall or door to which it is to be affixed. When the anchoring site 380 is attached to the vertical surface 385, the front side 370 and the coating thereon 380 are exposed and thus available for attachment to the hook or knob. Then one or more hooks 396 or knobs 391 are affixed to the anchoring site(s) via electrically neutral attachment forces. The one or more or knobs can be removed from the anchoring site(s) and re-attached or a different set of hooks or knobs can be attached to the same anchoring site(s) one or more times.

2. Direct Attachment of an Article to a Vertical Surface

In another embodiment, the attachment system can be used to attach pictures, paintings, signs, or TV sets on vertical surfaces without the use of additional detachable hooks. In this embodiment, one or more anchoring sites are affixed to a vertical surface via the surface of the anchor side with the PSA, while the surface with the anchoring site coating is exposed. One or more part A coating strips are affixed to an item such as a TV set, picture or painting. The item with the one or more part A coating strips is then attached directly to the one or more anchoring sites on the vertical surface via electrically neutral attachment forces. The item can be removed and re-attached to the anchoring site or replaced with another item one or more times.

3. Attaching Articles to a Horizontal Surface, Such as a Floor

In another embodiment, the attachment system can be used to attach tiles, carpet tiles, carpets, or other articles on a horizontal surface, such as a floor.

Figure 4A:
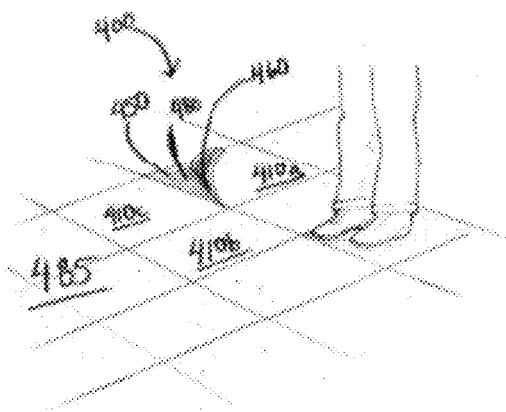
FIG. 4A is a schematic of a plurality of carpet tiles that incorporate the attachment system 400 on a floor 485.
Figure 4B:
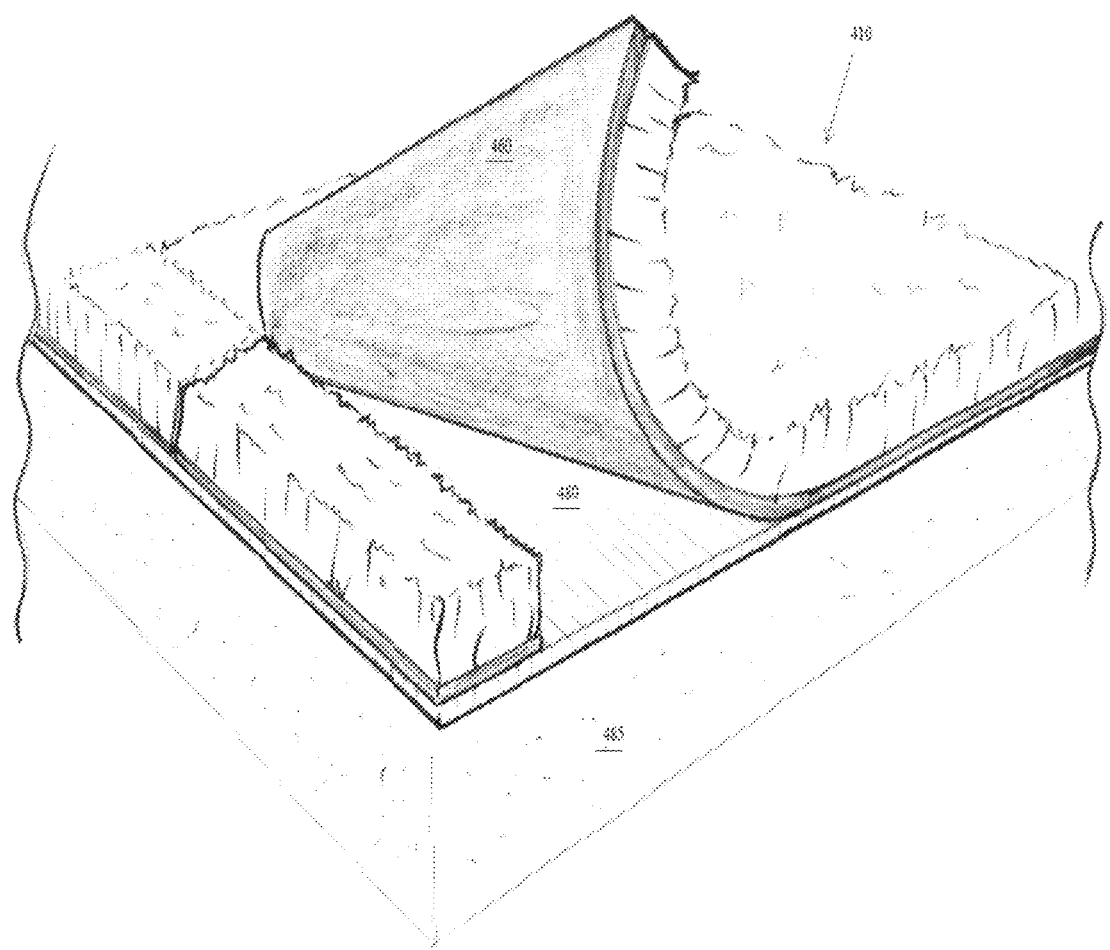
FIG. 4B is a magnified view of one carpet tile partially raised relative to the anchoring site on the floor.

FIGS. 4A and 4B depict an exemplary embodiment of a plurality of carpet tiles attached to a plurality of anchoring sites on a floor. The back side of the carpet tile 410 contains a part A coating 460. The anchoring site 450 is on the horizontal surface 485. The anchoring site 450 contains a front side 470, which is covered in part or completely with a coating 480, and a back side (not shown in figures), which is covered in whole or in part by an adhesive, typically a PSA.

In this embodiment, one or more anchoring sites 450 are affixed to a horizontal surface 485 via the surface (not shown in figures) of the anchoring site with the PSA, while the opposite surface, i.e. the front side 470 of the anchoring site, which contains the anchoring site coating 480 is exposed. One or more part A coating strips 460 are affixed to a tile, carpet tile 410, or portion or a carpet, to be affixed to the horizontal surface 485, such as the floor. The detachable article 410 is attached to the anchoring site 450 by contacting the part A coating 460 on the back side of the detachable article 410 with the coating 480 on the front side 470 of the anchoring site 450. This allows the article 410 to attach to the floor via electrically neutral attachment forces between the part A coating and the coating on the anchoring site.

The article 410 can be removed and re-attached to the anchoring site or replaced with another article one or more times.

4. Blood Pressure Cuff and Straps

In another embodiment, the attachment system can be used in blood pressure cuffs. In this embodiment, the detachable article with one or more part A coating strips and the one or more anchoring sites are on the same object.

Figure 5:
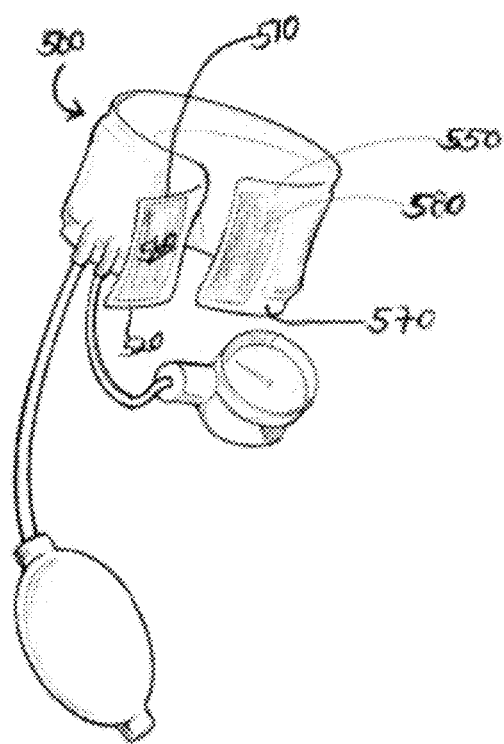
FIG. 5 is a schematic of an exemplary blood pressure cuff which incorporates the attachment system described herein.

In one embodiment, the attachment system may be incorporated into a blood pressure cuff 500. As depicted in FIG. 5, the blood pressure cuff 500 contains an anchoring site 550 and detachable article 510. The detachable article 510 contains a back side 520 with one or more part A coating strips 560. The anchoring site 550 contains a front side 570 containing an anchoring site coating 580, which covers at least a portion of the front side of the cuff 500.

In this embodiment, the detachable article 510 with one or more part A coating strips 560 and the one or more anchoring sites 580 are on the same object, i.e. the cuff 500. In use, the detachable article 510 is a portion of the cuff containing the part A coating 560, which is folded to contact the front side 570 of the anchoring site 550 containing the anchoring site coating 580, which is located on another portion of the cuff (or vice versa). The cuff remains in the closed position, i.e., with the detachable article 510 portion of the cuff attached to the anchoring site 550 on the other portion of the cuff, during the inflation and deflation of the cuff. Upon completion of a blood pressure measurement procedure, the detachable article 510 can be detached from the anchoring site 550 via the manual application of a pull-off force.

In another embodiment, the attachment system can be incorporated in a strap that is used to fasten one or more objects together, where both the anchoring site and the detachable object are located on two different portions of the strap. For example, as depicted in FIG. 6, the strap 600 includes an anchoring site portion 650 on one end 604 and the front side 670 of the strap and a detachable article portion 610 on the opposite end 602 and the opposite side 620 of the strap.

The detachable article portion 610 is attached to the anchoring site portion 650 by contacting the back side 620 of the strap 600 containing the part A coating 660 with the front side 670 of the strap 600 containing an anchoring site coating 680.

Figure 6:
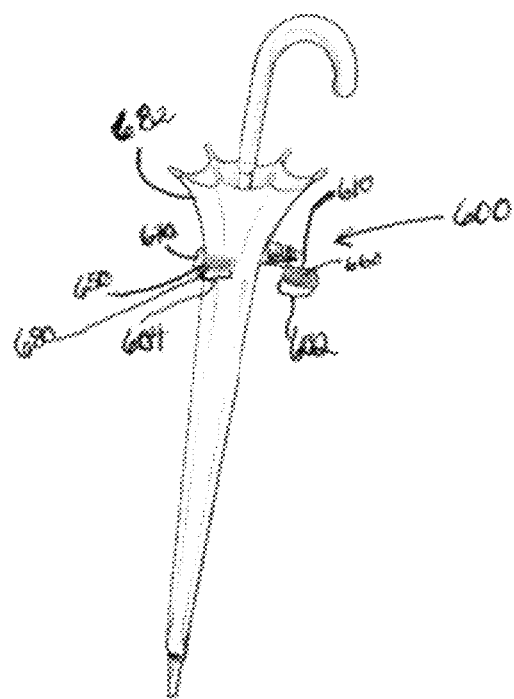
FIG. 6 is a schematic of an umbrella which incorporates the attachment system described herein. The attachment system 600 contains an anchoring site 680 and detachable article 610, which are incorporated in the strap for fastening the canopy 682 of the umbrella.

In one exemplary embodiment, as illustrated in FIG. 6, the object to be fastened is the canopy 682 of an umbrella. However, one of ordinary skill in the art will understand that alternative objects or groups of objects may be fastened together using a strap, such as a belt on a jacket or other article of clothing, where the belt is constructed similar to the strap in FIG. 6.

5. Climbing Assistance Article

In still another embodiment, the attachment system is combined with a shoe, glove, or handle to facilitate movement along a vertical surface, horizontal surface and/or climbing a rope. In this embodiment, one or more anchoring sites are affixed to a vertical or horizontal surface via the surface of the anchoring site with the PSA, while the opposite surface of the anchoring site, which contains an anchoring site coating is exposed.

One or more part A coating strips are affixed to a surface on an article, such as a shoe, gloves, and/or handles (optionally the article is manufactured with or previously assembled with the part A coating strip on the surface). The article is attached to the one or more anchoring sites on the horizontal surface via electrically neutral attachment forces. The article can be removed and re-attached in progressive anchoring sites or different areas on the anchoring site (if it is a long anchoring site), one or more times to facilitate movement.

EXAMPLES

Example 1

Preparation and Testing of Labeling Systems

Sample Preparation

Part A formulations were coated onto 9.7 Mil PET film facesheet using a Mayer rod bar coater with target coat weights of 5 lb/3000 sq. ft. and 21 lb/3000 sq. ft. The coated facesheets were air dried at 120° F. for 10 minutes. The coated facesheets were allowed to condition at room temperature in ambient humidity overnight prior to testing.

The properties of the materials used to prepare the part A coatings on the facesheets that were tested are shown in Table 1.

TABLE 1

Properties of materials used to form
part A coatings on the facesheets

| ID | Description | Tg (° C.) | Acid # |
|---|---|---|---|
| 1 | ammonium salt of styrene acrylic emulsion | −17 | 170 |
| 2 | ammonium salt of modified acrylic copolymers emulsion | −18 | 52 |
| 3 | styrene acrylic dispersion | <−40 | 76 |
| 4 | ammonium salt of styrene acrylic emulsion | −5 | 52 |
| 5 | ammonium salt of modified acrylic copolymers emulsion | 13 | 45 |
| 6 | modified ethylene acrylic acid dispersion | 40-42 | 155 |
| 7 | ammonium salt of styrene acrylic emulsion | −16 | 53 |
| 8 | sodium salt of styrene maleic anhydride resin | 155 | 465-495 |

Extreme 0° Peel Testing

The device 100 shown in FIG. 1A was used to perform the extreme 0° peel testing. Coated facesheets were cut into 1"×6" strips 110. The detachable article 110 contained a lower surface 160 and an upper surface 130. The lower surface of the detachable article 110 was coated with a part A coating 165.

Figure 1B:
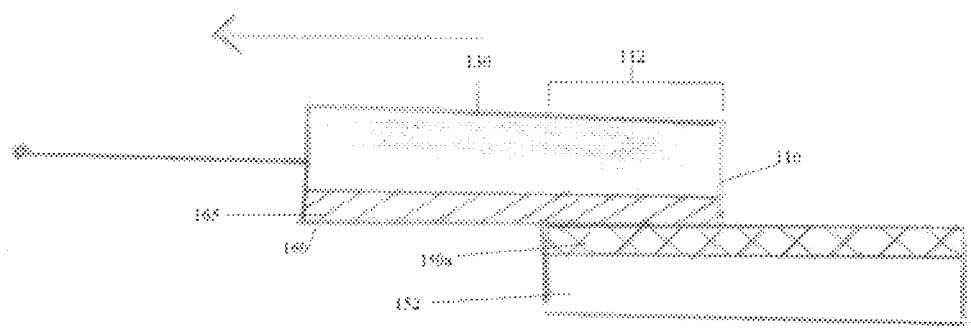
FIG. 1B is a magnified view of a portion of the 0° peel test system depicted in FIG. 1A, focusing on the interaction between the detachable article and the anchoring site as the detachable article is pulled in the direction of the arrow.

In order to test extreme 0° peel strength, a 1 inch$^2$ portion 112 of the coated facesheet 110 being tested was applied to a co-extruded plasticized poly vinyl chloride (PVC) anchoring site coating strip 150a attached to a substrate 152 that was previously secured to a stage 115 via a vice clamp 125. The remaining 5 inch$^2$ region 114 of the coated facesheet 110 was applied to a second co-extruded plasticized poly vinyl chloride (PVC) anchoring site coating strip 150b, which is attached to one end of a sample leader 145. A Mini Crane Model SF-918 Scale 155 (commercially available from Jiangyin Suofei Electronic Technology Co., Ltd, Jiangsu, China) was attached to the anchoring site sample leader 145 by placing the scale hook into a hole located at the other end of the sample leader 145. Extreme 0° peel strength measurements were made by gradually pulling the coated facesheet 110, 0° relative to the anchoring site coating strip 150, by way of the lever-Mini Crane Scale-anchoring site leader-coated facesheet construct 165, in a direction lateral to the surface of the anchoring site, as depicted in FIGS. 1A and 1B, until coated facesheet failure was achieved.

Coated facesheet failure was defined as the point at which the 1 inch$^2$ coated facesheet was removed from the anchoring site. The force required to remove the 1 inch$^2$ region of the coated facesheet was then recorded as the maximum 0° peel strength. The extreme 0° peel strength values shown in Table 2 were measured 10 minutes following coated facesheet application.

180° Peel Testing

Figure 2A:
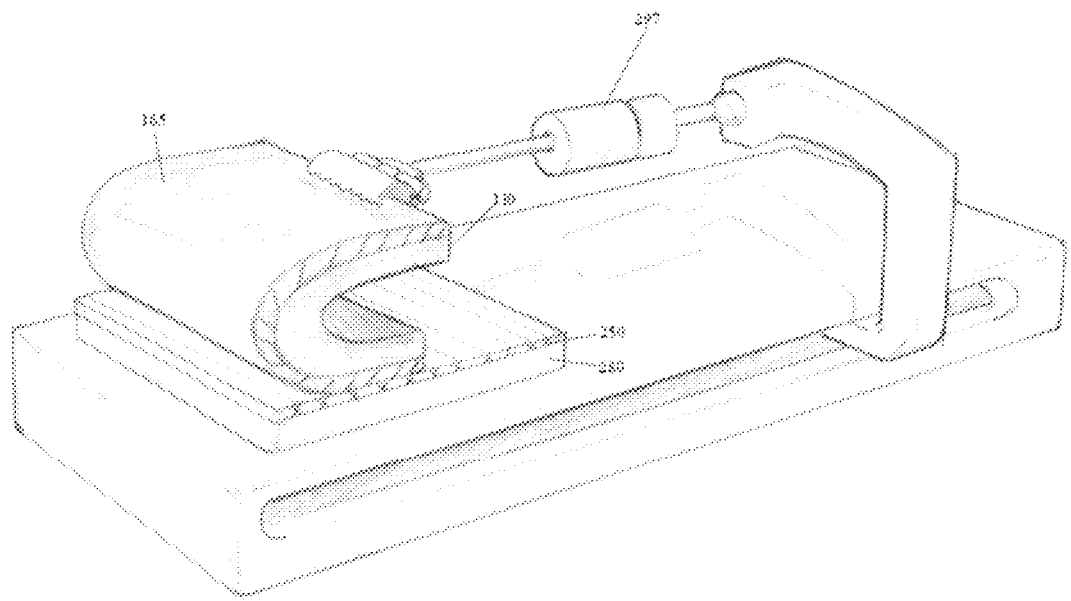
FIG. 2A is a schematic of a device 700 that can be used to perform the 180° peel testing.

FIG. 2A shows a schematic of the device 200 and the set up used to perform the 180° peel testing. Coated facesheets were cut into 1"×6" strips 110 and applied to co-extruded plasticized poly vinyl chloride (PVC) anchoring site coating strip 280, parallel to the ground. Quantitative peel strength values were measured with the same modified ASTM D3330 method as described above. The lower surface 160 of a facesheet 110 containing a part A coating 165 was placed on the upper surface of an anchoring site (a stage) 280 containing an anchoring site coating 250. The detachable article 110 was rolled backward 180° using an arm 297 of the pulling device 200.

Figure 2B:
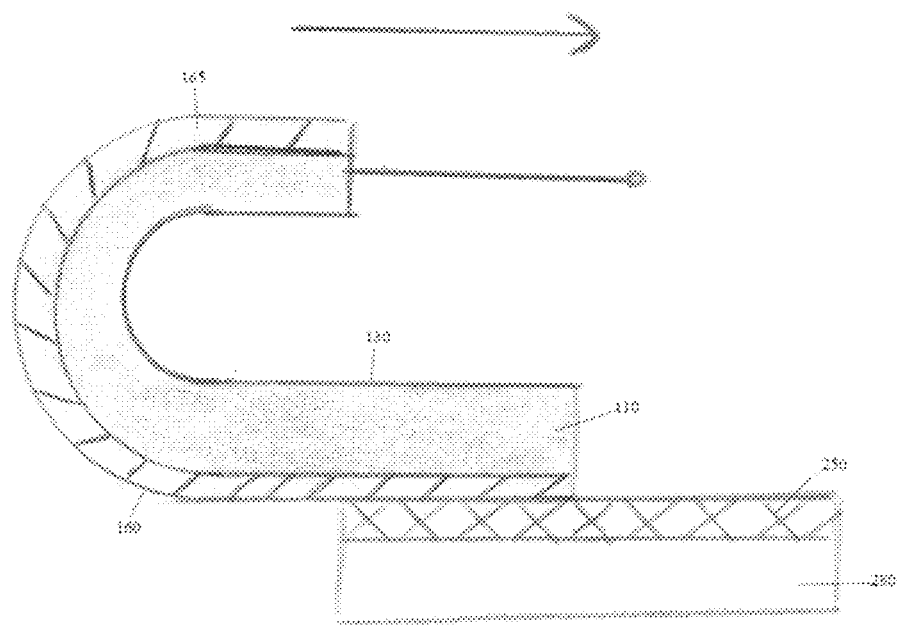
FIG. 2B is a magnified view of a portion of the 180° peel test system depicted in FIG. 2A, focusing on the interaction between the detachable article and the anchoring site as the detachable article is pulled in the direction of the arrow.

The peel strengths of the coated facesheets were measured at 180°, by applying a pull-off force as depicted in FIGS. 2A and 2B.

% Transfer

The percentage of coating transfer from the article to the anchoring site was determined visually. Samples with <5% transfer had little to no coating residue on the anchoring site after sample removal. Heavy transfer, reported at 90%, represents complete coating transfer to the PVC. <5% transfer is preferred for articles to be reusable and reapply-able. Heavy transfer would render the article and anchoring site unusable and therefore would be applicable for one time use or security applications.

Heat Seal Blocking

Facesheets were cut into 1.5"×6" strips and placed on top of the top coated side of the facesheet. The sample was compressed for 90 seconds under 60 psi of pressure at 120° F., n=2. The force required to separate the two strips of paper was evaluated to give a blocking rating of excellent, good, fair and poor. An excellent indicates that the two strips fell apart by themselves suggesting that the coating exhibits no blocking A rating of good indicates very slight blocking while a score of poor is given to samples that result in paper tear at peeling.

The peel strength values shown in Table 2 were measured 10 minutes following article application.

The compositions of the film and the results of the peel testings described above are shown in Table 2.

TABLE 2

0° and 180° Peel Strengths for Formulations # 1 to 6

| | Component 1 | | Component 2 | | ~5 lbs/3000 ft$^2$ | | ~21 lbs/3000 ft$^2$ | | | | | |
|---|---|---|---|---|---|---|---|---|---|---|---|---|
| | | | | | 0° Peel strength (gram/ | 180° Peel Strength (gram/ | 0° Peel strength (gram/ | 180° Peel Strength (gram/ | ~Average Tg | ~Average | | Heat Seal |
| Formulation | ID | % | ID | % | inch) | inch) | inch) | inch) | (° C.) | Acid# | % Transfer | Blocking |
| 1 | 1 | 100 | | | 40000 | 40 | 50000 | 60 | −17 | 170 | <5% | Excellent |
| 2 | 2 | 90 | 6 | 10 | 100000 | 1040 | 110000 | 990 | −12 | 62 | 90% | Good |
| 3 | 5 | 90 | 6 | 10 | 75000 | 715 | 80000 | 1170 | 16 | 56 | <5% | Excellent |
| 4 | 1 | 50 | 4 | 50 | 60000 | 55 | 80000 | 90 | −11 | 111 | <5% | Excellent |
| 5 | 7 | 90 | 8 | 10 | 65000 | 70 | 80000 | 40 | 1 | 96 | <5% | Good |
| 6 | 3 | 100 | | | 60000 | 50 | 70000 | 90 | <−40 | 76 | <5% | Excellent |

Unless defined otherwise, all technical and scientific terms used herein have the same meanings as commonly understood by one of skill in the art to which the disclosed invention belongs. Publications cited herein and the materials for which they are cited are specifically incorporated by reference.

Those skilled in the art will recognize, or be able to ascertain using no more than routine experimentation, many equivalents to the specific embodiments of the invention described herein. Such equivalents are intended to be encompassed by the following claims.

We claim:

1. An attachment system, comprising a liner-less part A coating strip and an anchoring site,
    wherein the part A coating strip is located on a first portion of an object, and the anchoring site is located on a second portion of the object,
    wherein the part A coating strip attaches to the anchoring site via electrically neutral attachment forces, wherein the part A coating strip resists shear stress when it is attached to the anchoring site, and
    wherein the part A coating strip has a 0° peel strength between 40,000 and 100,000 g/in, inclusive, as measured when the part A coating strip is placed on top of the anchoring site and the part A coating strip is pulled in a direction parallel with the plane of the part A coating strip, wherein the anchoring site is clamped to prevent its movement.

2. The attachment system of claim 1, wherein the anchoring site comprises an anchoring site coating or an anchoring site coating strip.

3. The attachment system of claim 2, wherein the anchoring site coating strip comprises polyvinyl chloride, and one or more plasticizers.

4. The attachment system of claim 1, wherein the part A coating strip is integrated into or affixed to the first portion of the object.

5. The attachment system of claim 1, wherein the object is a blood pressure cuff.

6. The attachment system of claim 1, wherein the part A coating strip is formed from a material selected from the group consisting of polyvinyl alcohols; polyvinyl acetates; polyvinylpyrrolidones; polyvinylpyrrolidone-vinyl acetate copolymers; polyacrylic acids; polyethylene glycols; poly (2-ethyl-2-oxazoline); polyacrylamide copolymers; ethylene vinyl acetates; natural and reclaimed rubbers; polyurethanes; non-carboxylated and carboxylated styrene-butadiene rubbers; polyacrylates based on the polymerization of monomers of methacrylates, methyl acrylate, ethyl acrylate, 2-chloroethyl vinyl ether, 2-ethylhexyl acrylate, hydroxyethyl methacrylate, butyl acrylate, or butyl methacrylate; polyamides; polyesters; polyolefins; chlorinated-polyolefins; polyolefins containing maleic anhydride; polystyrene acrylates; polystyrenes; polyvinyl esters; polyvinyl ketones; polydiene elastomers; polyiso butylenes; poly butadienes; polychloroprenes; poly styrene acrylics; carboxylated acrylic; styrene and/or butadiene polymers; cellulose derivatives; ureas; gelatins; alginates; agars; gum arabics; and combinations thereof.

7. The attachment system of claim 1, wherein the part A coating strip comprises an acrylic polymer, and wherein the coating on the anchoring site comprises plasticized polyvinyl chloride.

8. The attachment system of claim 1, wherein the object is a strap.

9. A method for using an attachment system, wherein the attachment system comprises a liner-less part A coating strip and an anchoring site, wherein the part A coating strip is located on a first portion of an object, and the anchoring site is located on a second portion of the object,
    the method comprising:
    (i) applying the part A coating strip to the anchoring site, wherein the anchoring site is affixed to the object; and
    (ii) removing the part A coating strip from the anchoring site, wherein no transfer of coating from the part A coating strip to the anchoring site occurs;
    wherein the part A coating strip attaches to the anchoring site via electrically neutral attachment forces; wherein the part A coating strip resists shear stress when it is attached to the anchoring site;
    wherein the part A coating strip has a 0° peel strength between 40,000 and 100,000 g/in, inclusive, as measured when the part A coating strip is placed on top of the anchoring site and the part A coating strip is pulled in a direction parallel with the plane of the part A coating strip, wherein the anchoring site is clamped to prevent its movement.

10. The method of claim 9, wherein the anchoring site is permanently attached to the object via co-extrusion during manufacturing.

11. The method of claim 9, wherein the side of the anchoring site that is not in contact with the object comprises an anchoring site coating strip.

12. The method of claim 11, wherein the anchoring site coating strip comprises polyvinyl chloride and one or more plasticizers.

13. The method of claim 9, wherein the part A coating strip is integrated into or affixed to the first portion of the object.

14. The method of claim 9, further comprising (iii) repeating steps (i) and (ii) one or more times.

* * * * *